July 27, 1943.　　　　W. B. RAYTON　　　　2,325,275
PHOTOGRAPHIC OBJECTIVE
Filed Feb. 12, 1942

F 6.3　　FOCAL LENGTH = 100 MM

| | | | |
|---|---|---|---|
| I | $R_1$ = 16.44 | $D_1$ = 4.40 | $N_D$ = 1.6109 |
| | $R_2$ = 19.72 | $L_1$ = 0.80 | $\nu$ = 57.2 |
| II | $R_3$ = 21.10 | $D_2$ = 1.97 | $N_D$ = 1.6109 |
| | $R_4$ = 25.10 | $L_2$ = 0.95 | $\nu$ = 57.2 |
| III | $R_5$ = 13.08 | $D_3$ = 0.69 | $N_D$ = 1.7200 |
| | $R_6$ = 10.87 | $L_3$ = 7.40 | $\nu$ = 29.3 |
| | | $L_4$ = 8.74 | |
| IV | $R_7$ = 10.87 | $D_4$ = 0.65 | $N_D$ = 1.7200 |
| | $R_8$ = 13.14 | $L_5$ = 1.51 | $\nu$ = 29.3 |
| V | $R_9$ = 26.34 | $D_5$ = 7.87 | $N_D$ = 1.6109 |
| | $R_{10}$ = 18.04 | | 57.2 |

WILBUR B. RAYTON
INVENTOR
BY
ATTORNEYS

Patented July 27, 1943

2,325,275

UNITED STATES PATENT OFFICE 2,325,275

PHOTOGRAPHIC OBJECTIVE

Wilbur B. Rayton, Rochester, N. Y., assignor to Bausch & Lomb Optical Company, Rochester, N. Y., a corporation of New York Application February 12, 1942, Serial No. 430,647

4 Claims. (Cl. 88—57)

The invention relates to objectives and more particularly to photographic objectives which are also suitable for use for projection purposes.

An object of the invention is to provide an improved objective lens which covers an extraordinarily wide field of view with great freedom from distortion. Another object is to provide an objective of the just mentioned character which has excellent definition. A further object of my invention is the provision of an objective having a plurality of meniscal lenses arranged on either side of the locus of diaphragm, two positive elements and a negative element being positioned in front of the diaphragm and a positive element and a negative element being positioned in back of the diaphragm.

With these and other objects in view which may be incident to my improvements, the invention consists in the parts and combinations to be hereinafter set forth and claimed, it being understood that the various elements of the invention may be varied in construction, proportion, arrangement and material without departing from the spirit of the invention or exceeding the scope of the appended claims.

To make the invention more clearly understood, the accompanying drawing shows means for carrying it into practical effect without limiting the useful applications of the improvements to the particular constructions which are illustrated to explain the invention.

Photographic lenses, used in applications where an extraordinarily large field of view is to be covered with excellent definition, are in general well corrected to overcome distortion as well as the aberrations which bear on definition. Where a lens is free of distortion, the geometrical configuration of the image formed by the lens will be an exact reproduction of the geometrical configuration of the object space as viewed from the first nodal point of the lens.

The most successful of such lenses heretofore employed consists in the one case of four meniscus shaped elements mounted in pairs consisting of one positive and one negative element with one of such pairs being mounted in front of the diaphragm and the other being mounted in back of it. An objective of the just described character is shown in U. S. Patent 2,031,792 to R. Richter. In another case, the positive element of the pair of menisci mounted in back of the diaphragm is replaced by a double element consisting of two positive menisci separated by an air space in the manner shown in U. S. Patent 2,116,264 issued to J. W. Hasselkus et al.

While both of the described lenses of the prior art are well corrected for distortion, they nevertheless possess a residual distortion which is objectionable in photography intended as a basis for making accurately scaled maps. The amelioration of this defect has been noted as an aim of my invention. This aim I attain by means of the lens construction illustrated in Figure 1.

Figure 1:
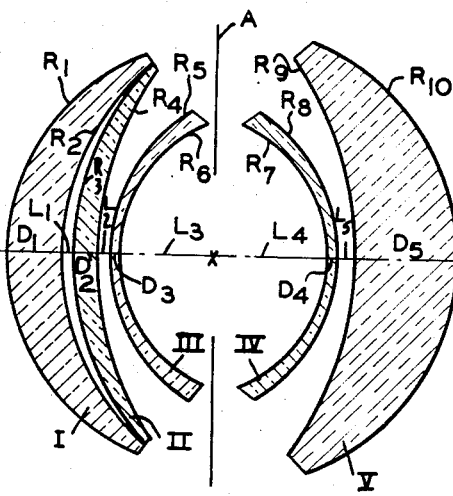
Figure 1 is a section taken along the axis of an objective lens which embodies my invention.

With reference to the drawing, the lens of Figure 1 comprises two positive meniscal elements I and II and a negative meniscal element III located in front of the locus of a diaphragm A with a negative meniscal element IV and a positive meniscal element V positioned on the other side or in back of the diaphragm. The concave side of each element faces towards the diaphragm. As may be observed, the elements I and II are spaced so that they contact each other but, due to the curvature of their adjacent surfaces, have an air space between them. This air space has the shape of a positive meniscus. On the other hand, the air space between elements II and III and that between elements IV and V is each in the shape of a negative meniscus. Elements I and II are the only elements of the lens in contact with one another, the remaining elements being separated as disclosed.

As described herein, the side of the diaphragm which faces the long conjugate of the lens is considered as the front of the diaphragm regardless of whether or not the lens is used as a photographic or a projection objective. Thus the elements I, II and III located on the left of the locus of the diaphragm would constitute the front elements of the lens while the elements IV and V would form the back elements of the lens.

To illustrate one form of the invention, conventional construction data for a lens of 100 mm. focal length, field of view of 90° and relative aperture of f/6.3, is given in the table which directly follows.

| Radii | Thicknesses and distances | Kinds of glass |
|---|---|---|
| $R_1 = 16.44$ | | |
| | $D_1 = 4.40$ | $N_D = 1.6109$  $V = 57.2$ |
| $R_2 = 19.72$ | | |
| | $L_1 = 0.80$ | |
| $R_3 = 21.10$ | | |
| | $D_2 = 1.97$ | $N_D = 1.6109$  $V = 57.2$ |
| $R_4 = 25.10$ | | |
| | $L_2 = 0.95$ | |
| $R_5 = 13.08$ | | |
| | $D_3 = 0.69$ | $N_D = 1.7200$  $V = 29.3$ |
| $R_6 = 10.87$ | | |
| | $L_3 = 7.40$ | |
| | $L_4 = 8.74$ | |
| $R_7 = 10.87$ | | $N_D = 1.7200$  $V = 29.3$ |
| | $D_4 = 0.65$ | |
| $R_8 = 13.14$ | | |
| | $L_5 = 1.51$ | |
| $R_9 = 26.34$ | | $N_D = 1.6109$  $V = 57.2$ |
| | $D_5 = 7.87$ | |
| $R_{10} = 18.04$ | | |

In the table and in the drawing, $L_3$ represents the spacing between the element III and the center of the diaphragm, indicated at X, while $L_4$ designates the spacing from the diaphragm to the element IV.

The described design provides a lens which is highly corrected as a unit for all of the aberrations and possesses exceptional freedom from distortion. Superiority of performance of the lens of Figure 1, due to its limited distortion, will be apparent on comparison with the prior art lenses heretofore noted. This is done graphically by the linear distortion curves of Figure 2 wherein displacements of image points are plotted as ordinates against angular field of view as abscissae for the lens of my invention and for the two mentioned prior art lens designs.

Figure 2:
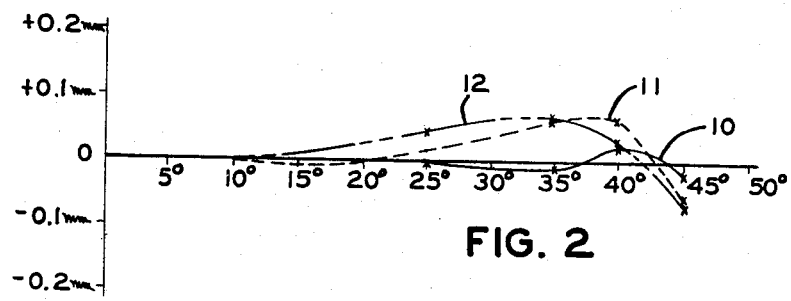
Figure 2 shows a linear distortion curve for the objective of my invention in comparison with similar curves for several prior art types of objectives.

In Figure 2, full line curve 10 represents the displacement present with my objective while dotted line curve 11 shows distortion for a lens like that of Patent 2,116,264 and the dot and dash curve 12 shows distortion for a lens similar to that in Patent 2,031,792, the cross marks shown being used to indicate points on the various curves. Comparing the curves, maximum distortion for my objective is shown as around 0.023 mm. while that in curves 11 and 12 is respectively about 0.064 mm. and 0.72 mm. These values for distortion have been computed for that value of focal length that results in minimum values for the displacement of image points from their ideal position. It will be noted that the residual distortion in my lens amounts to only a third of the values hitherto obtained.

The thickness of the element V and the width of the air space $L_5$ have considerable effect upon the residual distortion. Both of these dimensions are kept as small as possible. As the lens of Figure 1 is designed to have a 90° field of view, the necessity to make the element V of sufficient diameter to transmit light to a point 45° from the center of the field will set a definite limit to the thickness of the element. Also, the width of the air space $L_5$ must be selected with regard to its effect upon the various aberrations. If it were not for these considerations, elimination of distortion might be accomplished by suitable choice of these dimensions, but a sacrifice of lens definition is to be expected where such practice is attempted.

However, it has been discovered that the introduction of the air space $L_1$ between the positive menisci, I and II, has the effect of permitting aberrations bearing on definition to be substantially eliminated. Thus by controlling, within the possible limits mentioned in the foregoing, the thickness $D_5$ of the positive element V and the widths of the air spaces $L_5$ and $L_1$, I am enabled to provide a corrected lens which has a minimum of distortion.

In obtaining a lens performance comparable with the full line curve 10 of Figure 2, it is to be noted that the thickness of the various elements forming the lens of my invention together with their various radii of curvature are to be reproduced with a precision of a higher order than is customarily required in photographic lens practice. Variations in the curvature of surfaces, for example, amounting to as little as 0.1% are significant in their effect on the final result. By variations is meant not departures from true figure but the substitution for the specified surface of a perfectly spherical surface whose radius of curvature differs by that small amount from the prescribed value.

From the foregoing, it will be appreciated that I have accomplished the aims and objects of my invention in that I have provided a wide angle objective lens, the distortion of which has been greatly reduced from that present in prior art devices. At the same time, it will be apparent that I have obtained these aims and objects without sacrifice to the definition of the lens.

I claim:

1. An objective lens comprising two groups of positive and negative meniscus shaped lens elements which are axially spaced apart in unsymmetrical relation on opposite sides of a locus of diaphragm, the concave surfaces of each element facing the locus of diaphragm, the positive elements being positioned on the outside of the negative elements, the negative elements being adjacent the locus of diaphragm with one on each side thereof, the group of elements in front of the locus of diaphragm comprising a negative element and two positive elements spaced apart a small fraction of the focal length of the objective as a whole and with the surfaces of the two positive elements in contact with each other only at their peripheral portions, the group of elements in back of the locus of diaphragm comprising a negative element and a positive element spaced apart a small fraction of the focal length of the objective as a whole.

2. An objective lens system comprising five meniscus shaped lens elements arranged in axial alignment in two groups located on opposite sides of a locus of diaphragm with each element of the system separated from an adjacent element by an air space and with each element positioned to have its concave surface towards said locus of diaphragm, the group of elements in front of the locus of diaphragm being formed of a pair of positive elements between which and said locus of diaphragm there is located a negative element, the concave surface of the outer element of said pair having a shorter radius of curvature than the convex surface of the other element of the pair, the air space between the two positive elements in front of said locus of diaphragm having the shape of a positive meniscus while the air space between said negative element in front of the locus of diaphragm and the positive element adjacent thereto has the shape of a negative meniscus, the group of elements in back of said locus of diaphragm being formed of a negative element adjacent the locus of diaphragm and a positive element separated from said last-mentioned negative by an air space having the shape of a negative meniscus.

3. An objective lens comprising two groups of meniscal elements, each element being separated by an air space which is a fraction of the focal length of the lens as a whole and each of said groups having a negative and a positive element, each group lying on an opposite side of a locus of diaphragm with the negative element thereof nearest the locus of diaphragm, the group to the front of the locus of diaphragm having a third element in the shape of a positive meniscus, all of said elements being arranged in axial alignment to have their concave surfaces face towards the locus of diaphragm and being spaced unsymmetrically with respect to each other and also to the locus of diaphragm, the adjacent surfaces of the two positive elements of the group in front of the locus of diaphragm being in contact with each other adjacent their edges but being separated by an air space which has a shape of a positive meniscus, the air space between each negative element and the positive element adjacent thereto having a shape of a negative meniscus.

4. An objective lens comprising two groups of positive and negative meniscal elements with the groups positioned on the respective sides of the locus of diaphragm, the concave surfaces of all of the elements facing the locus of diaphragm, the elements of each group being spaced apart at their central portions by a distance which is a small fraction of the focal length of the lens as a whole, one of said groups comprising two positive elements and a negative element with the negative element positioned adjacent the locus of diaphragm, the concave surface of the outer element of said last-named group having a radius of curvature which is shorter than the radius of curvature of the convex surface of the other positive element of said last-named group.

WILBUR B. RAYTON.